United States Patent Office 2,970,185
Patented Jan. 31, 1961

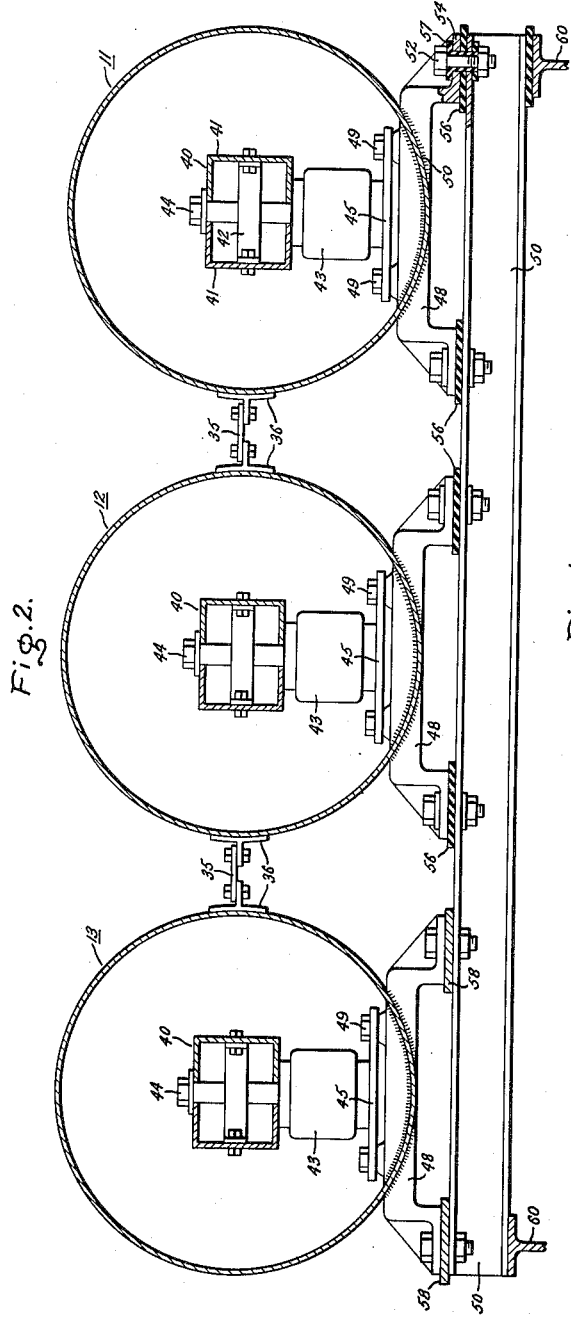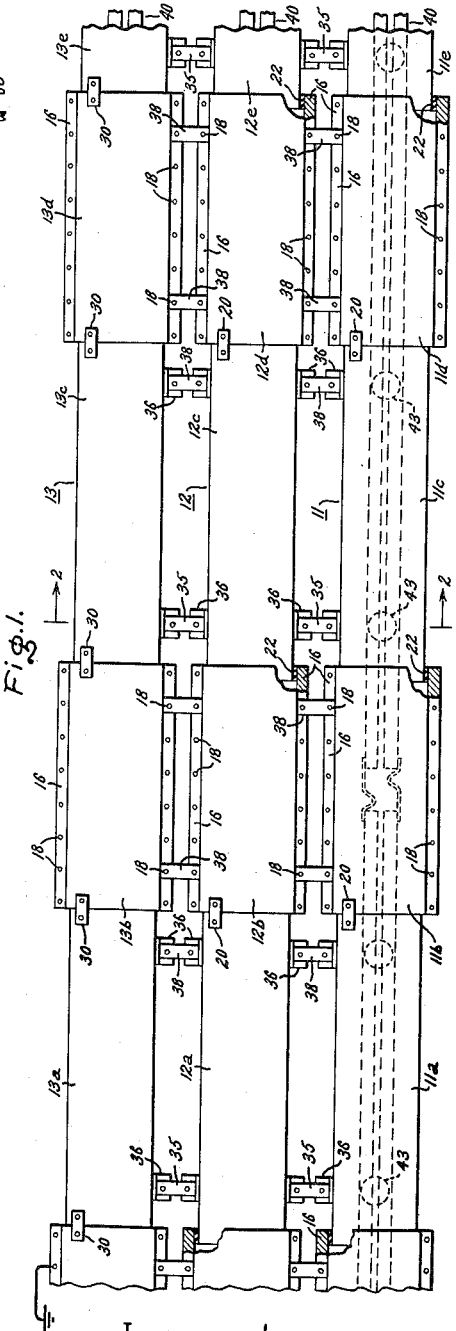

2,970,185

ELECTRIC BUS DUCT APPARATUS

Nathan Swerdlow, Philadelphia, and Walter R. Wilson, Broomall, Pa., assignors to General Electric Company, a corporation of New York Filed Oct. 31, 1958, Ser. No. 771,131

6 Claims. (Cl. 174—99)

This invention relates to electric bus duct apparatus of the isolated-phase type and, more particularly, to an improved scheme for grounding the usual ducts that are used to enclose the conductors of such apparatus.

In the usual isolated-phase bus duct apparatus, each of the main conductors is enclosed by a grounded duct or enclosure of tubular configuration. It is customary to construct each of these ducts from juxtaposed lengths of duct mechanically connected together in end-to-end relationship with insulation provided between the juxtaposed lengths. Each of these lengths is connected to ground at only a single point and is otherwise insulated from ground by suitable insulation. The insulation between the lengths of duct and the insulation between each length and ground serve two purposes. One of these purposes is to prevent the eddy currents induced in a particular duct from circulating between that particular duct and the adjacent ducts and also between that particular duct and the grounded supporting structure for the ducts, thus preventing the undesirable heating which tends to result from such circulating eddy currents. The other of these purposes is to direct faults that occur to the duct to ground via a path extending through a ground return bus.

In prior arrangements of this general type, it has been difficult to test the above described insulation. For example, an ordinary bell set has not readily lent itself to such tests because, generally speaking, there has always been a parallel circuit through grounded structure by-passing the insulation. Thus, if a test connection were made to one duct length through a battery and a bell to another duct length, the bell would ring whether the insulation being tested were sound or not because of the above-mentioned parallel circuit through the grounded structure.

Thus, one of the objects of our invention is to construct the apparatus in such a manner that duct insulation of the above-described character can be readily tested for its soundness.

Another disadvantage of prior arrangements of the aforementioned general type is the unduly large number of insulating joints which require testing in order to determine whether the apparatus is in good working condition.

It is another object of our invention to construct the apparatus in such a manner that, as compared to prior arrangements, a considerably reduced number of insulating joints is required for proper functioning of the apparatus.

Another object is to minimize the amount of conductive material that is needed in order to provide a proper ground return path for fault current to any of the ducts.

In carrying out our invention in one form, we provide two side-by-side bus ducts each of which comprises a plurality of tubular duct lengths secured together in end-to-end relationship with insulation provided between juxtaposed duct lengths to prevent the flow of current therebetween. The ducts are mounted on suitable supporting structure by means of joints that comprise insulation for preventing current flow between the ducts and the supporting structure through the joints. Bracing structure peripherally-spaced from the joints and extending between the ducts is provided for resisting distortion of the duct walls during short-circuit conditions. This bracing structure comprises, for each set of laterally-adjacent duct lengths, a rigid conductive member peripherally-spaced from said joints and electrically connected between the duct lengths of each set at a single longitudinally-restricted location. This conductive member serves not only as a brace between the duct walls but also as a grounding member. Except for the connection provided by this conductive member, the duct lengths of each set are otherwise insulated from each other. The connection between the conductive member and at least one of its duct lengths is readily detachable so as to allow for quick electrical isolation of the duct lengths from each other, thus permitting the duct insulation to be readily tested. A ground return bus extends alongside one of the ducts, and the duct lengths of said one duct are each electrically connected to said ground return bus, but at only a single longitudinally-restricted location on each of said latter duct lengths.

In accordance with an additional feature of our invention, the ground return bus is constituted by a third tubular duct which serves not only as a ground return bus but also as an enclosure for a third conductor of the apparatus. This third duct comprises tubular duct lengths mechanically connected together in end-to-end relationship with a conductive connection provided between the immediately adjacent ends of each pair of juxtaposed duct lengths.

For a better understanding of our invention, reference may be had to the following description taken in connection with the accompanying drawing wherein:

Fig. 1 is a plan view of three-phase bus duct apparatus embodying our invention, and Fig. 2 is a cross-sectional view taken along the line 2—2 of Fig. 1.

Referring now to Fig. 1, we have illustrated a fragmentary section of a three-phase enclosed and isolated electric bus run comprising three side-by-side generally parallel bus ducts 11, 12 and 13. Each bus duct is formed of a plurality of open-ended tubular sections mechanically connected together in end-to-end relationship. The tubular sections of each duct are denoted by the suffixes a, b, c, d, and e attached to the reference numeral used for that particular duct. For example, the tubular sections of duct 11 are designated 11a, 11b, 11c, 11d, and 11e.

In each of the ducts, the sections with the suffixes a, c and e may be thought of as being main duct sections, and the duct sections with the suffixes b and d may be thought of as being auxiliary duct sections. Each of the main duct sections has generally continuous peripheral walls, whereas each of the auxiliary duct sections is formed of two semi-cylindrical halves having longitudinally-extending mating flanges 16 bolted together by means of suitable bolts 18 located at spaced-apart points along the length of the flanges. These auxiliary duct sections are occasionally referred to hereinafter as split covers. When the bolts 18 are removed, the two halves of each of the split covers can be disassembled so as to afford access to the interior of the duct for repair and maintenance purposes. At each of its ends, each split cover embraces a main duct section so that when the two halves of the split cover are clamped together, the split cover is firmly clamped about the two main duct sections which it interconnects.

In the two bus ducts 11 and 12, each split cover is electrically connected to the duct section located at one of its ends and is insulated from the duct section at the other of its ends. For example, at its left hand end in Fig. 1, split cover 11b is electrically connected to the main duct section 11a by means of conductive bars such as 20 electrically bridging the mechanical joint between the duct sections 11a and split cover 11b. At its right hand end in Fig. 1, split cover 11b is insulated from main duct section 11c by means of an insulating ring 22 interposed between the duct section 11c and the split cover 11b. Similarly, split cover 11d is electrically connected to the duct section 11c at its left hand end and is insulated from the duct section 11e at its right hand end. The bus duct 12 is constructed in a corresponding manner, i.e., with each of its depicted split covers (12b and 12d) electrically connected to the duct section at its respective left hand end and insulated from the duct section at its respective right hand end.

From the above description of the bus ducts 11 and 12, it will be apparent that each of these bus ducts comprises duct lengths (such as one length formed by the combination of 11a and 11b and a second length formed by the combination of 11c and 11d) connected together in end-to-end relationship and electrically insulated from each other.

Laterally adjacent lengths of the ducts 11 and 12 are electrically connected together, but at only a single longitudinally-restricted location on each length. For example, the duct length 11a, 11b and the duct length 12a, 12b are electrically interconnected, but at only one longitudinally-restricted location, that being near their respective left hand ends by means of a conductive bar 35 extending between the duct lengths. This conductive bar 35 is bolted to T-shaped fixtures 36, which are welded to the sides of the main duct sections, as is shown more clearly for example in Fig. 2.

Other mechanical connections are shown between the laterally-adjacent duct lengths 11a, 11b and 12a and 12b, but these connections are constructed at least partially of insulating material and thus do not afford conductive paths between the laterally adjacent duct lengths. These insulating mechanical connections between the laterally adjacent duct lengths comprise short bars 38 of insulating material. Those bars 38 which are provided between the laterally adjacent main duct sections are bolted to T-shaped fixtures 36 corresponding to those already described hereinabove, whereas those bars 38 which are provided between the laterally-adjacent split covers are bolted to the flanges of the split covers by means of the bolts 18. The purpose of the various connections between the laterally-adjacent duct lengths will be described in greater detail hereinafter.

The bus duct 13 differs from the other bus ducts 11 and 12 in that in duct 13 all of the duct sections are electrically connected together in series-circuit relationship. In this regard, conductive bars 30 are bolted between the immediately adjacent ends of each pair of juxtaposed duct sections so as to form an electrical connection bridging the joint between the juxtaposed duct sections. No significant electrical insulation is provided between the juxtaposed duct sections. The bus duct 13 is solidly connected to ground at the source end of the bus duct run. By connecting all the duct sections of duct 13 in series circuit relationship and by connecting the duct 13 to ground at one end, we are able to use this duct 13 as a ground return bus for fault currents flowing to the duct 13 from any of the conductors of the apparatus. The manner in which this ground return bus operates will be described in greater detail hereinafter.

The internal construction of the bus duct apparatus of Fig. 1 can be of any suitable conventional type, but we prefer to rely upon the type of construction shown and claimed in application S.N. 770,970—Mankoff et al., filed October 31, 1958. This construction is best illustrated in Fig. 2, which is a sectional view taken along the line 2—2 of Fig. 1. It will be noted from Fig. 2 that each duct has mounted internally thereof a conductor 40 which extends along the length of each duct in a position generally coaxially with respect to the duct. The conductor 40 is shown constructed from a pair of channels 41 secured together in face-to-face relationship by means of suitable brackets 42 interconnecting the channels. For mounting the conductor 40 within its corresponding duct, there are provided at points spaced-apart along the length of the conductor 40, single insulating posts 43 disposed in a plane generally perpendicular to a plane containing the axes of all of the conductors 40. The conductor 40 is secured to these posts 43 by means of suitable tie bolts 44 extending between the channels 42. Each of the insulating posts 43 is mounted on a resilient base plate 45, which, in turn, is mounted on a fixed support 48 and is secured thereto by means of suitable bolts 49 disposed at opposite ends of the base plate.

Each of the fixed supports 48 extends in a chordal direction across the lower portion of its duct and is fitted into a slot provided in the duct. The duct is secured to the support 48 by suitable means such as a welded joint 50 provided between the perimeter of the slot and the support 48. Thus, the supports 48 not only support the conductor 40 but also support each of the ducts 11, 12 or 13 enclosing the conductor. The supports 48 are provided at opposite ends of each of the main duct sections and provide the sole supporting structure for both the main duct sections and the split covers. In other words, the split covers do not themselves contain such supports but are simply clamped about the main duct sections, which do contain the supports 48. The conductor 40 of each duct is divided into axially spaced segments which are electrically interconnected by suitable flexible jumpers. Each segment of conductor 40 extends continuously through its main duct section and has its opposite ends disposed within the split covers, thereby locating the flexible joints between the segments of conductor 40 within the split covers.

The supports 48 for the three ducts are preferably disposed in longitudinally-aligned positions along the length of the duct so that a single transverse beam can be utilized as a common support for the three ducts at each insulator station. For example, in Fig. 2 three aligned supports 48 are shown bolted to such a transverse beam 50, which is preferably of steel, by means of bolts 52 extending through lugs 54 provided at opposite ends of each support 48.

All of the supports 48 for each of the ducts 11 and 12 are insulated from their supporting structure by insulating spacers such as shown at 56 in Fig. 2, provided between each support 48 and the beam 50 on which the support is mounted. A suitable insulating sleeve 57 including insulating washers at its ends is also provided about each of the bolts 52 for the ducts 11 and 12 to prevent the bolts 52 from forming an electrical connection bridging the insulating spacers 56. The purpose of the insulating spacers 56 will soon be pointed out in greater detail.

The supports 48 for the remaining duct 13 are preferably not insulated from the supporting beams 50. In this regard, the spacer 58 provided between the supports 48 for the duct 13 and the beams 50 are preferably of metal.

The purpose of the resilient base plates 45 mounting each conductor 40 is to allow the conductor 40 under short-circuit conditions to move from its normal coaxial position toward a zero-force line position. At the zero-force line position, a conductor will have no further tendency to move even as the short circuit current is increased. This principle is explained in the aforementioned application S.N. 770,970, Mankoff et al., and reference may be had to that application for a more complete description of such principle. It is explained in the aforementioned Mankoff application that the physical position of the aforementioned zero-force line is dependent upon the geometric configuration of the duct. If the duct becomes unduly distorted during short circuits, the zero-force line position can be shifted so far from the center of the duct that the insulating posts 43 can become overloaded. The purpose of the bars 35 and 38 interconnecting laterally adjacent lengths of duct is to limit this duct-distortion to such an extent that the insulators 43 do not become detrimentally overloaded as a result of such short circuit conditions. In this respect, the bars 35 and 38 act as braces which limit duct-distortion to the required extent.

The metallic bars 35 serve the dual purpose of acting not only as braces between laterally adjacent duct sections but of acting also as ground bars for conducting fault current to the duct 13, which serves as the ground return bus for the apparatus. In this regard, any fault occurring in the duct 12 will flow to ground via a path extending through the walls of the duct length in which the fault occurs, the metallic bar 35 connected to that particular duct length, and the ground return bus duct 13. Similarly, any fault occurring in duct 11 will flow to ground via a path extending through the wall of the duct length in which the fault occurs, the metallic bar 35 connected to that particular duct length, the walls of duct 12, another metallic bar 35 connected to duct 12, and the ground return bus duct 13.

It will be apparent that the bus duct 13 is capable of serving as a ground return bus over substantially its entire length. For this reason and also because the duct is generally coaxial with respect to its conductor, the bus duct 13 provides a ground return bus of very low reactance.

The eddy currents that are induced in the ducts 11, 12, and 13 by power current flowing through the conductors 40 tend to flow longitudinally of the ducts. These eddy currents are prevented from circulating between adjacent ducts by reason of the fact that laterally-adjacent duct lengths are electrically connected together at only a single longitudinally-restricted location. Thus, there is no complete circuit for current tending to flow between the laterally-adjacent duct lengths. For example, considering a typical duct length 11a, 11b, eddy currents flowing longitudinally of this duct length 11a, 11b have available a path through the metallic brace 35, 36 to the adjacent duct length 12a, 12b but have no return path to the duct length 11a, 11b inasmuch as all of the other bars 38 between these duct lengths are of insulating material and inasmuch as the duct sections are insulated from the supporting beams 50 by the insulating spacers 56 shown in Fig. 2. The insulation provided at opposite longitudinal ends of the duct lengths 11a, 11b and 12a, 12b prevent eddy currents from finding a return path through a longitudinally-juxtaposed length of duct and its conductive bar 35.

Still considering the duct length 11a, 11b, it will be understood that eddy currents are precluded from circulating between duct length 11a, 11b and grounded beams 50 by means of the insulating spacer 56 provided between the duct lengths and the grounded beams. These insulating spacers provide electrical discontinuities in any conductive path extending through the beams 50 between all points on the duct length 11a, 11b. In other words, the insulating spacers prevent current from flowing between the beams 50 and either of the bus ducts 11 or 12 via a path extending through the joints (48, 52, 56, 57) between the bus ducts 11 and 12 and the beams 50.

It has been pointed out hereinabove that the duct 13 has all of its duct lengths electrically connected together in series. Although the duct length 11a, 11b is electrically connected to this continuous conducting structure 13 through the conductive bars 35 and the walls of duct 12, no eddy currents will circulate over this path and through the duct 13 back to the duct length 11a, 11b because of the discontinuity provided in such circuit by the insulation located at the right hand end of duct length 11a, 11b as seen in Fig. 1.

Although we have particularly described only the manner in which eddy currents are prevented from circulating between the duct length 11a, 11b and adjacent structure, it is to be understood that eddy currents in all of the other duct lengths of ducts 11 and 12 are prevented from circulating through adjacent structure in substantially the same manner.

Although the duct 13 is electrically connected to the grounded beams 50, the amount of eddy currents that will flow externally to the duct 13 through the beams is relatively small. In this regard, the usual steel building structure (partially shown at 60) on which the beams 50 are mounted provides a conductive path external to the duct 13 interconnecting the ends of each duct length of duct 13, but this conductive path has an impedance so much higher than that of the aluminum duct length, that the amount of current flowing over such path is small and unobjectionable.

Eddy currents flowing in the duct 13 are prevented from finding a circulating path via the adjacent conductive duct 12 inasmuch as each duct length of the adjacent duct 12 is connected to the duct 13 at only a single longitudinally-restricted location (i.e., where the conductive bar 35 is located).

The building steel referred to hereinabove typically comprises a set of beams (such as 60) extending between a plurality of the transverse beams 50 at opposite ends of each transverse beam. To break up longitudinal circulating paths through the building steel 60, an insulating spacer is preferably disposed at one end of each transverse beam between the transverse beam 50 and the building steel 60.

With the grounding arrangement of the present invention, it is a simple matter to test the insulation between the longitudinally juxtaposed duct lengths of ducts 11 and 12. All that is necessary prior to testing such insulation is that the metallic bar or bars 35 connected to one of the two juxtaposed duct lengths be unbolted and removed, which is a step that can be performed quickly and with little difficulty. In the case of the outside duct 11, only one bar 35 need be removed. In the case of the center duct 12, only the two bars 35 connected to one of the center duct sections need be removed. An ordinary bell set comprising the series combination of a battery and a bell is then connected across the insulation being tested to the two juxtaposed duct lengths. If the bell does not ring, the insulation is sound. If it rings, this is an indication that the insulation is faulty.

A similar procedure can be used for testing the insulation between the duct lengths and the grounded beams 50. With the conductive bar 35 of the duct length in question removed, the duct length is completely isolated from ground, assuming that its insulation between the duct length and the beam is sound. A bell set connected across such insulation between the duct length and the grounded beam 50 will provide an indication of the soundness of the insulation.

The fact that the bus duct 13 is used as a ground return bus with its sections electrically connected together in series enables us to dispense with the usual insulation between its duct lengths. The fact that the bus duct 13 presents a very low impedance to fault currents flowing to ground (especially in comparison to the impedance of the path through the usual steel building structure) enables us to dispense with the usual insulation between the duct 13 and the grounded beams 50 on which the duct 13 is mounted since nearly all of the fault current will flow to ground through the bus duct 13, even in the absence of such insulation. Thus, no insulation testing is required for the duct 13 in order to determine its working condition. Simplifying the insulation testing required for two of the ducts and eliminating the need for insulation testing as to the other duct are important factors enabling the user of the apparatus to make the required insulation tests in a considerably shorter time than has been possible with most prior designs.

Another advantage of the disclosed arrangement is that it requires a considerably smaller amount of ground bus than prior designs. In this regard, nearly all of the parts that form the ground return paths serve additional functions. For example, the conductive bars 35 serve as braces between the adjacent ducts; the central duct 12 which electrically interconnects a set of bars 35, serves as the usual enclosure for its conductor; and the ground bus 13 serves as the usual enclosure for its conductor. By utilizing these parts to perform multiple functions, considerable economies can be realized.

Although we prefer that one of the bracing bars (35) for each set of laterally-adjacent duct lengths be of metal so as to render it capable of serving as a grounding bar, it is possible to form all of the bracing bars of insulation and to interconnect the adjacent walls of laterally-adjacent duct lengths by a suitable flexible conductor serving no bracing function. Although such a modified arrangement does not provide all of the economies of the illustrated arrangement, it still enables the walls of the center duct 12 to serve as part of the conductive structure for connecting the outer duct 11 to ground and, to this extent, affords economies over prior arrangements.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. Isolated phase bus duct apparatus comprising a pair of side-by-side electrically conductive tubular ducts, a conductor mounted within each duct and electrically isolated therefrom, each of said ducts comprising a plurality of tubular duct lengths secured together in end-to-end relationship, insulating means between longitudinally-adjacent duct lengths for precluding the flow of current between said lengths, supporting structure at locations longitudinally spaced along said ducts for supporting said ducts, joints disposed between said ducts and said supporting structure and comprising insulation for precluding electrical current from flowing through said joints, bracing structure peripherally spaced from said joints and extending between said ducts for resisting distortion of the walls thereof during short circuit conditions, said bracing structure comprising for each set of laterally-adjacent duct lengths a rigid conductive member peripherally spaced from said joints and electrically connected between the duct lengths of said set at a single longitudinally-restricted location on each duct length, said bracing structure further comprising insulating means for precluding current flow between said duct lengths by all paths other than a path extending through said rigid conductive member, the connection between said rigid conductive member and at least one of its duct lengths being readily detachable so as to allow for quick electrical isolation of said laterally-adjacent duct lengths from each other, a ground return bus extending alongside one of said ducts, and means for electrically connecting each of the duct lengths of said one duct to said ground return bus comprising conductive structure mechanically connected to said latter duct lengths at only a single longitudinally-restricted location on each of said latter duct lengths.

2. Isolated-phase bus duct apparatus comprising a pair of side-by-side electrically conductive tubular ducts, a conductor mounted within each duct and electrically isolated therefrom, each of said ducts comprising a plurality of tubular duct lengths secured together in end-to-end relationship, insulating means between longitudinally-adjacent duct lengths for precluding the flow of current between said lengths, supporting structure at locations longitudinally spaced along said ducts for supporting said ducts, joints for mounting said ducts on said supporting structure, bracing structure peripherally spaced from said joints and extending between said ducts for resisting distortion of the walls thereof during short circuit conditions, said bracing structure comprising for each set of laterally-adjacent duct lengths a rigid conductive member peripherally spaced from said joint and electrically connected between the duct lengths of said set at a single longitudinally-restricted location on each duct length, insulating means for precluding current flow between laterally-adjacent duct lengths by all paths other than a path extending through said rigid conductive member and for further precluding current flow between said ducts and said supporting structure through said joints, the connection between said rigid conductive member and at least one of its duct lengths being readily detachable so as to allow for quick electrical isolation of duct lengths of said set from each other, a ground return bus extending alongside one of said ducts, and means for connecting each of the duct lengths of said one duct to said ground return bus at only a single longitudinally-restricted location along the length of each of said latter duct lengths.

3. Isolated phase bus duct apparatus comprising a pair of side-by-side electrically conductive tubular ducts, a conductor mounted within each duct and electrically isolated therefrom, each of said ducts comprising a plurality of tubular duct lengths secured together in end-to-end relationship, insulating means between longitudinally adjacent duct lengths for precluding the flow of current between said lengths, supporting structure at locations longitudinally spaced along said ducts for supporting said ducts, joints for mounting said ducts on said supporting structure, bracing structure peripherally spaced from said joints and extending between said ducts for resisting distortion of the walls thereof during short circuit conditions, said bracing structure comprising for each set of laterally adjacent duct lengths a rigid conductive member peripherally spaced from said joint and electrically connected between the duct lengths of said set at a single restricted location on each duct length, insulating means for precluding current flow between laterally adjacent duct lengths by all paths other than a path extending through said rigid conductive member and for further precluding current flow between said ducts and said supporting structure through said joints, the connection between said rigid conductive member and at least one of its duct lengths being readily detachable so as to allow for quick electrical isolation of the duct lengths of said set from each other, a third conductor, a third tubular duct enclosing said third conductor and extending alongside said pair of tubular ducts, said third duct comprising discrete duct lengths mechanically connected together in end-to-end relationship, means including a conductive connection between the immediately adjacent ends of each pair of juxtaposed duct lengths of said third duct for causing fault current from any one of said conductors to its corresponding duct to flow to ground via a path extending through the series combination of the duct lengths of said third duct whereby said third duct serves as a ground return bus for said apparatus; said last-mentioned means comprising conductive structure electrically connected between each of the duct lengths of one of said pair of ducts and said third duct at a single longitudinally-restricted location on each of said latter duct lengths and insulating means requiring all current flow between each of said latter duct lengths and said third duct to follow a path through said conductive structure.

4. The apparatus of claim 3 in which said third tubular duct is conductively connected to said supporting structure in such a manner that minor amounts of fault current in said third duct can flow to ground through said supporting structure.

5. Isolated phase bus duct apparatus comprising a pair of side-by-side electrically conductive tubular ducts, a conductor mounted within each duct and electrically isolated therefrom, each of said ducts comprising a plurality of tubular duct lengths secured together in end-to-end relationship and insulated from each other to preclude the flow of current between longitudinally-adjacent lengths, supporting structure at locations longitudinally spaced along said ducts for supporting said ducts, joints disposed between said ducts and said supporting structure and comprising insulation for precluding electrical current from flowing through said joints, means for electrically interconnecting the duct lengths of each laterally-adjacent set of duct lengths comprising electrically-conductive structure peripherally-spaced from said joints and extending between said ducts, means for attaching said conductive structure to the tubular walls of each duct length at only a single longitudinally restricted location on each duct length, insulating means for precluding current from flowing between the duct lengths of each set of laterally-adjacent lengths at all points except through said electrically-conductive structure peripherally-spaced from said joints, said electrically-conductive structure being readily detachable from at least one of the duct lengths of each set of laterally-adjacent lengths so as to allow for quick electrical isolation of said duct lengths from each other, a ground return bus extending alongside one of said ducts, and means for electrically connecting each of the duct lengths of said one duct to said ground return bus comprising conductive structure mechanically connected to the tubular walls of said latter duct lengths at only a single longitudinally-restricted location on each of said latter duct lengths.

6. The apparatus of claim 5 in which said ground return bus comprises a third tubular duct for enclosing a third conductor, said third tubular duct comprising duct lengths mechanically connected together in end-to-end relationship, and means including a conductive connection between the immediately adjacent ends of each pair of juxtaposed duct lengths of said third duct for causing fault current from any one of said conductors to its corresponding duct to flow to ground via a path extending through the series combination of the duct lengths of said third duct.

References Cited in the file of this patent

UNITED STATES PATENTS

| | | |
|---|---|---|
| 2,293,310 | Rudd | Aug. 18, 1942 |
| 2,531,017 | West et al. | Nov. 21, 1950 |
| 2,775,643 | Scott | Dec. 25, 1956 |
| 2,783,299 | Schymik | Feb. 26, 1957 |